C. H. GRIFFIN.
Dressmaker's Square.
No. 234,273. Patented Nov. 9, 1880.
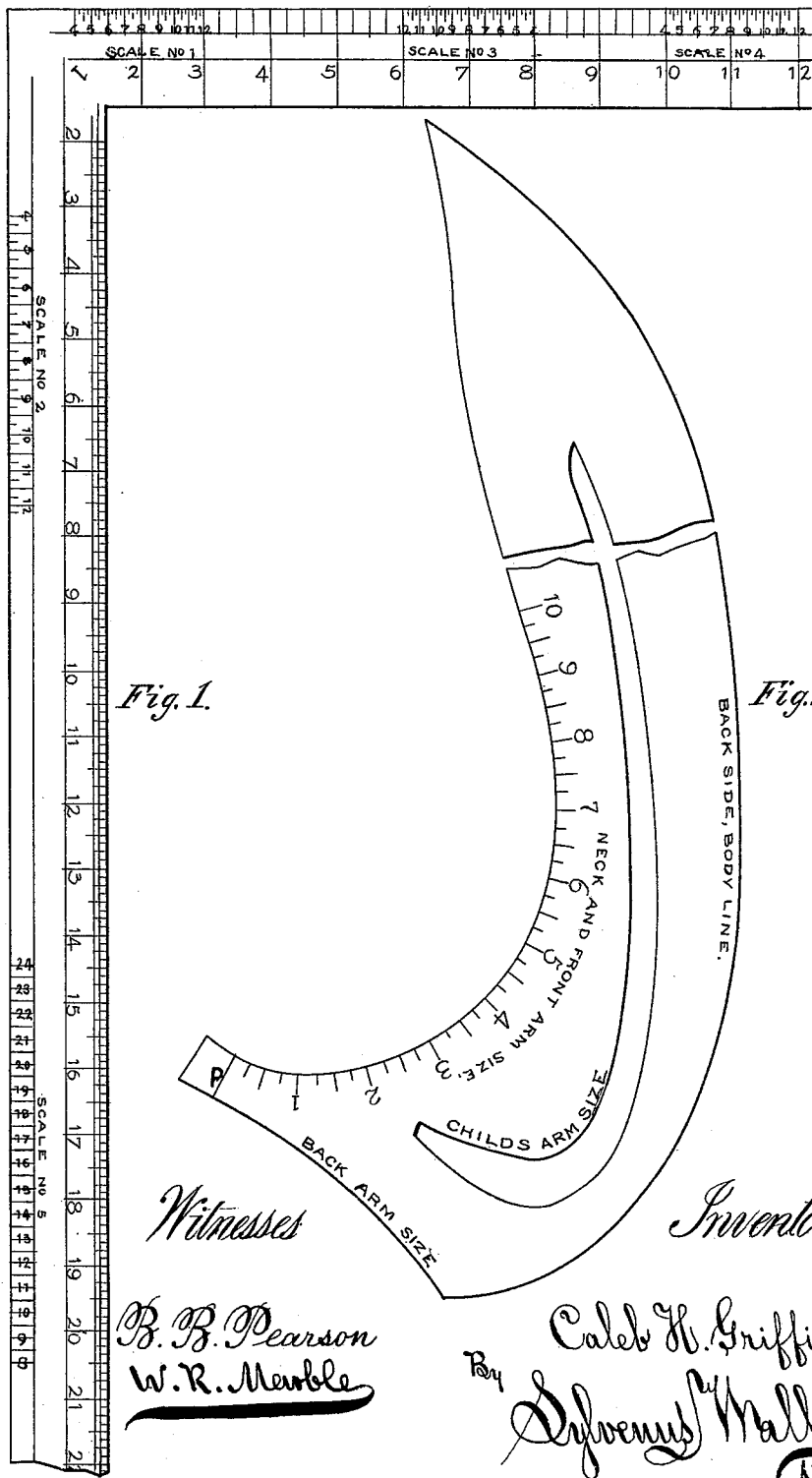

UNITED STATES PATENT OFFICE.

CALEB H. GRIFFIN, OF BOSTON, MASS., ASSIGNOR TO ELVIRA L. HAMLIN, OF SAME PLACE, AND JOHN SMITH, OF NEW YORK, N. Y.; SAID ELVIRA L. HAMLIN AND JOHN SMITH ASSIGNORS TO LEONARD F. WISE, OF BOSTON, MASS.

DRESS-MAKER'S SQUARE.

SPECIFICATION forming part of Letters Patent No. 234,273, dated November 9, 1880.

Application filed December 13, 1878.

*To all whom it may concern:*

Be it known that I, CALEB H. GRIFFIN, of Boston, in the county of Suffolk and State of Massachusetts, have invented certain new and useful Improvements in Dress-Makers' Squares, of which the following is a specification.

The object of my invention is to provide a cheap, simple, and convenient square provided with the usual inches and subdivisions, and with certain figures and scales to be used in connection with the common measuring-tape in taking the dimensions or measurements of the various portions of the human body above the waist, and apply such measurements to the scales and figures or inches upon the square, so as to draft a pattern or diagram on paper, to be cut out and used as a pattern for cutting garments, taking the "slope-of-shoulder" measure as a basis for the various scales instead of the breast-measure, as heretofore.

Figure 1 is a view of one side of my square. Fig. 2 is a view of one side of a dress-maker's curved pattern.

In the drawings at Fig. 1 is seen, upon the short arm of the square, Scale No. 1, consisting of seventeen lines, the alternate lines being numbered from 4 to 12, inclusive, occupying two inches space, the lines being one-eighth of an inch apart. The measurements by this scale are based upon the slope-of-shoulder measure, and commence at the corner of the square to indicate one-half the size of neck. Also, upon the short arm of the square is seen Scale No. 3 and Scale No. 4. These scales are numbered and divided the same as Scale No. 1, and are located or placed two inches apart, and form a double scale, being numbered in each direction from a center line between them, each scale being composed of seventeen lines, the alternate lines being numbered from 4 to 12, inclusive, the lines being one-eighth of an inch apart, taking the slope-of-shoulder measure as a basis for these scales. They are used to determine the outer and inner points of the two apertures at the sides of the garment for the sleeves. The inner portion of the arm is marked with the usual inches and subdivisions, commencing at its juncture with the long arm of the square.

Upon the long arm of the square, near its juncture with the short arm, will be seen Scale No. 2, composed of thirty-three lines, every fourth line being numbered with consecutive numbers from 4 to 12, inclusive, the lines being one-eighth of an inch apart. The measurements by this scale commence at the corner of the square, and are used to indicate the height of the neck by the slope-of-shoulder measure.

Near the lower portion of the long arm of the square will be seen Scale No. 5, composed of thirty-three lines one-fifth of an inch apart, and numbered alternately from 8 to 24, inclusive, being numbered consecutively, and used to determine one-half the size of the waist, in inches, by actual measurement, using one-half the waist-measure as a basis.

At Fig. 2 will be seen a diagram of a curved pattern of peculiar form, marked or lettered "back side, body line," "back arm size," "neck and front arm size," and "child's arm size."

Upon the inner lower portion of the pattern will be seen a scale in inches and subdivisions, commencing at a line, P, one-half inch from the end, every fourth line being numbered consecutively from 1 to 10 inclusive, and is used to determine one-half the size of the neck, in inches, the end P of the pattern being extended one-half inch, so as to indicate the exact size upon the scale to be employed instead of allowing a half-inch when measuring.

The extended curved slot shown in the pattern is designed for use in making what is known as a "V" in dress-making, to be applied or formed in each side of the waist, slightly in front of the center of the arm-size.

This pattern is employed in conjunction with the hereinbefore-described square, the various curves required to make a perfect-fitting garment being indicated at different points upon the pattern, as shown.

It will be seen that the various scales are based upon the slope-of-shoulder measure instead of the breast-measure, as heretofore, it being found that when the breast-measure is employed as a basis the neck of a dress is too low and the arm-size is too large when corpulent or fleshy ladies are being fitted, thereby causing much trouble and extra labor.

It will be observed that I have materially reduced the number of scales employed, and changed or reduced the numbers designating the division-lines of the scales, so as to avoid the confusion and liability to make mistakes, as is often the case wherein a very large number of scales are arranged and numbered with such minute divisions that the exact point cannot be determined and marked with that nice degree of accuracy required wherein squares as heretofore constructed are used.

I am aware that a pattern or chart for tailoring has heretofore been provided with a segmental curved opening, as shown in the patent to Stillwell; but such opening would not serve the purposes contemplated by my invention, as it is not provided with a graduated convex edge forming a scale.

Having thus described my invention, what I claim is—

1. The dress-maker's square provided with the Scales Nos. 3 and 4, each marked with figures from 4 to 12, and indicating inches and parts of inches in the slope-of-shoulder measure, all being constructed and arranged substantially as shown and described.

2. The square provided with the Scale No. 5, as shown, marked with figures from 8 to 24, and indicating inches and parts of inches in the waist-measure, all being constructed and arranged substantially as shown and described.

3. In combination with a dress-maker's curved pattern of the form shown, and having a graduated edge in inches and subdivisions, the line P, all being constructed and arranged for use, substantially in the manner described, as and for the purposes set forth.

CALEB H. GRIFFIN.

Witnesses:
SYLVENUS WALKER,
J. H. WHITMAN.